US006708214B1

(12) United States Patent
La Fleur (10) Patent No.: US 6,708,214 B1
(45) Date of Patent: Mar. 16, 2004

(54) HYPERMEDIA IDENTIFIER INPUT MODE FOR A MOBILE COMMUNICATION DEVICE

(75) Inventor: James P. La Fleur, San Francisco, CA (US)

(73) Assignee: Openwave Systems Inc., Redwood City, CA (US)

(*) Notice: Subject to any disclaimer, the term of this patent is extended or adjusted under 35 U.S.C. 154(b) by 0 days.

(21) Appl. No.: 09/552,996

(22) Filed: Apr. 21, 2000

(51) Int. Cl.[7] .............................................. G06F 15/173
(52) U.S. Cl. .................... 709/226; 709/225; 709/229; 707/6; 707/7
(58) Field of Search ................................ 709/203, 202, 709/249, 250, 225, 226, 229; 707/6, 7

(56) References Cited

U.S. PATENT DOCUMENTS

| 5,721,897 A | * | 2/1998 | Rubinstein | 707/2 |
| 5,801,691 A | * | 9/1998 | Dahl | 345/746 |
| 5,911,485 A | * | 6/1999 | Rossmann | 341/22 |
| 6,052,070 A | * | 4/2000 | Kivela et al. | 341/22 |
| 6,115,754 A | * | 9/2000 | Landgren | 709/249 |
| 6,192,258 B1 | * | 2/2001 | Kamada et al. | 455/566 |
| 6,219,731 B1 | * | 4/2001 | Gutowitz | 710/67 |
| 6,519,241 B1 | * | 2/2003 | Theimer | 370/338 |
| 2001/0000668 A1 | * | 5/2001 | Bodnar | 345/339 |

OTHER PUBLICATIONS

Phone.com Inc., "Phone.com UP.Browser", Redwood City, California, Aug., 1999, 2 pages.
Phone.com Inc., "UP Product Family", Redwood City, California, Aug., 1999, 16 pages.
Unwired Planet, Inc., "UP.Browser™ User Handbook", Redwood City, California, Dec., 1998, pp. 15–20.

* cited by examiner

Primary Examiner—Saleh Najjar
(74) Attorney, Agent, or Firm—Blakely, Sokoloff, Taylor & Zafman LLP (57) ABSTRACT

A mobile communication device operable to allow a user to access hypermedia content via a wireless link is configured to allow a user to more easily input hypermedia identifiers, such as Uniform Resource Locators (URLs). The device includes a processor, a display, a set of user input keys, each of which is operable to allow a user to input a predetermined numeral, and a storage facility in which a microbrowser program is stored. The microbrowser program is executed by the processor to configure the mobile telephone to allow the user to access remotely stored hypermedia content via the wireless link. Also stored in the storage facility are a plurality of URL fragments. Each URL fragment is associated with one of the user input keys. In response to a single predefined user input at a given one of the user input keys, the microbrowser program selects the corresponding URL fragment and causes the selected URL fragment to be displayed. The user may then input additional characters that are appended to the selected URL fragment, or the URL fragment may be appended to characters previously input by the user, to form a complete URL. The number of keystrokes required by the user to input a complete URL is thereby reduced.

6 Claims, 6 Drawing Sheets

HYPERMEDIA IDENTIFIER INPUT MODE FOR A MOBILE COMMUNICATION DEVICE

FIELD OF THE INVENTION

The present invention pertains to two-way mobile communication devices and, more particularly, to a user-interface for a two-way mobile communications device.

BACKGROUND OF THE INVENTION

For people and businesses requiring instant access to information, the Internet and intranets have provided a vehicle for near real-time delivery of information from an enormous number of sources. For many of those same individuals, two-way mobile communication devices, such as cellular phones, two-way pagers, Personal Digital Assistants (PDAs), Personal Information Managers (PIMs), and handheld computing devices, have provided a way communicating irrespective of locality. In recent years, these two rapidly-growing technologies have come together, such that the two-way mobile communication device has become one of many entry points into the Internet and intranets.

Devices used as vehicles to the Internet (or Intranets) generally have some features in common, whether they sit on a desktop or are held in the palm of the hand. One feature such devices may have in common is that they are used to display hypermedia content such as web pages. To do so, network servers and network personal computers (PCs) normally use standard web protocols and mark-up languages, such as Hypertext Transport Protocol (HTTP) and Hypertext Markup Language (HTML), respectively. Mobile devices generally use wireless protocols, such as Wireless Access Protocol (WAP) or Handheld Device Transport protocol (HDTP), and wireless markup languages, such as Wireless Markup Language (WML) and Handheld Device Markup Language (HDML), to accomplish the same task.

One problem associated with using mobile devices in this manner is the lack of user-friendliness of the user interface of many such devices. Because these devices are designed to be mobile, they normally have very compact keypads with 14 to 24 keys and very small displays. These restrictions exist because the subject mobile devices have to be able to fit into the palm of the hand and have to be relatively inexpensive.

For a device to gain a wide market in this venue, it must meet the needs of the intended users, and it must be easy to use. On a conventional PC, locating hypermedia content (e.g., a Web page) on the Internet or an intranet is a relatively easy task. Hypermedia content is generally located by the user specifying a Uniform Resource Locators (URL) in some manner, such as by typing it using a standard keyboard or by pointing to a hypermedia anchor (link) using a pointing device. However, as noted above, mobile devices generally do not include a standard keyboard or display. Unfortunately, most URLs include characters and phrases that can be difficult to input without a full-sized standard keyboard. For example, many URLs begin with "http://" and end with ".com", ".org" or ".gov". It can be burdensome and annoying for a user to have to enter these special phrases, one character at a time, each time the user wants to input a URL. Furthermore, some of these characters do not have a phone key equivalent, such as "/", ":", and "." Hence, these characters may be assigned to a key that is less apparent to the user.

SUMMARY OF THE INVENTION

The present invention includes a mobile communication device having a display and a set of user input controls and a method of operating such a device. In the method, a number of hypermedia identifier fragments are stored, and information specifying a correspondence between each of the hypermedia identifier fragments and one of the user input controls is maintained. In response to receiving a single user input at one of the user input controls, the information is used to select one of the stored hypermedia identifier fragments. The hypermedia identifier fragments may be Uniform Resource Identifier (URI) fragments, such as Uniform Resource Locator (URL) fragments.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described for reducing the number of inputs required for a user to access hypermedia content from a mobile communication device. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art.

As described in greater detail below, a mobile communication device from which a user can access hypermedia content over a wireless link can be configured to allow the user to more easily input hypermedia identifiers. This technique reduces the number of inputs required for a user to input a hypermedia identifier, making the device more ".user-friendly". The mobile communication device may be, for example, a portable (e.g., cellular) telephone, PDA, PIM, hand-held computing device, two-way pager, wireless-capable remote controller, or the like. The hypermedia identifiers may be, for example, Uniform Resource Identifiers (URIs), such as Uniform Resource Locator (URLs) and/or Uniform Resource Names (URNs) and/or any characters or character strings used to specify hypermedia content for purposes of accessing the hypermedia content. To facilitate description, however, the hypermedia identifiers are assumed to be URLs henceforth in this description.

The mobile device includes a processor, a display, a set of user input keys, each operable to allow a user to input a predetermined numeral, and a storage device in which a microbrowser program is stored. The microbrowser program is executed by a processor in the mobile device to allow the user to access remotely stored hypermedia content from the mobile device via a wireless link. Also stored in the storage device are a number of URL fragments, such as "http://", ".com", etc. The microbrowser provides a URL input mode, in which each URL fragment is associated with one of the user input keys. In response to a single user input at a given one of the user input keys, the microbrowser program selects the corresponding URL fragment and causes the selected URL fragment to be displayed. The user may then input additional characters that are automatically appended to the selected URL fragment, and the selected URL fragment is automatically appended to characters previously input by the user, to form a complete URL. Alternatively, the user may add an additional URL fragment to the existing URL fragment to complete the URL. The number of keystrokes required by the user to input a complete URL is thereby reduced. By providing the URL input mode, therefore, the number of keystrokes required for a user to input a URL is reduced, thereby reducing the opportunity for the user to become annoyed, frustrated, discouraged, confused or fatigued. In this way, the mobile device is made more "user-friendly".

Figure 1:
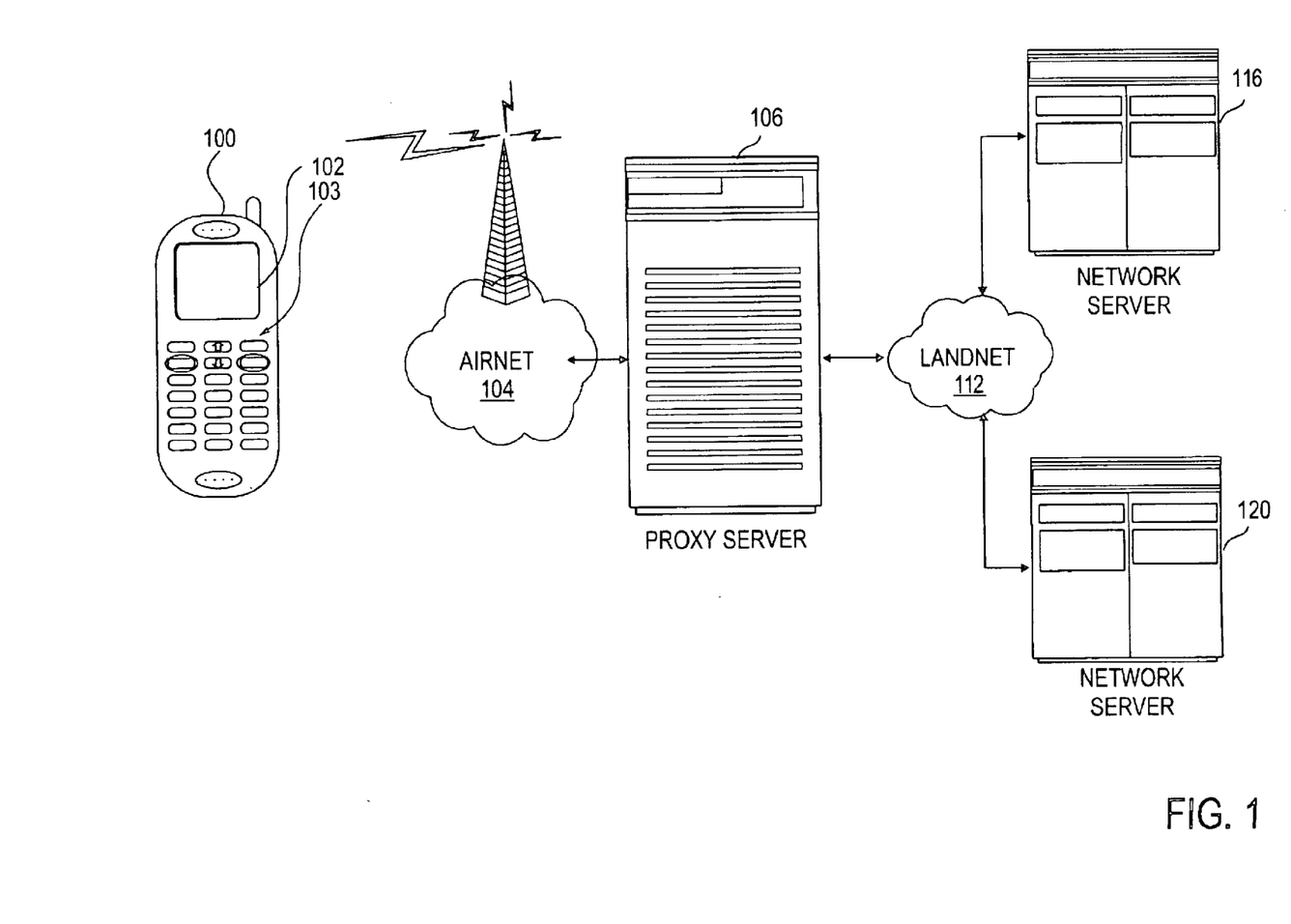
FIG. 1 illustrates a network in which a mobile communication device may be used.

FIG. 1 shows a network in which a mobile communication device (or simply "mobile device") such as mentioned above can be used. Mobile device 100 retrieves hypermedia information (e.g., HTML documents, Compact HTML (cHTML) documents, Extensible Markup Language (XML) documents, HDML documents, or WML documents) from one or more network server devices represented by network servers 116 and 120. Mobile device 100 has a display 102 and a user interface 103. Additionally, mobile device 100 may include a microbrowser, such as the UP.Browser microbrowser from Phone.com of Redwood City, Calif. Such a microbrowser may be stored in a local memory of the mobile device 100, which enables the mobile device 100 to access and retrieve hypermedia information from network servers 116 and 120. Network Servers 116 and 120 may, for example, be conventional computer workstations or PCs.

The communication path between mobile device 100 and network servers 116 and 120 includes airnet 104, proxy server device 108 and landnet 112. Airnet 104 is a wireless communication network, such as a cellular digital packet data network (CDPD), a Global System for Mobile (GSM) network, a Code Division Multiple Access (CDMA) network, a Time Division Multiple Access Network (TDMA) network. The communications protocols used by airnet 104 may include, for example, WAP and/or HDTP.

Proxy server device 108 may be, for example, a conventional computer workstation or PC. Proxy server device 108 acts a bridge between airnet 104 and landnet 112. Note, however, that the functions of proxy server device may be performed by a network server device (e.g. network servers 116 or 120) with hardware well known in the art providing the connection between airnet 104 and landnet 112.

Landnet 112 is a land-based network that may be or include the Internet, an intranet, or a data network of any private network, such as a Local Area Network (LAN). The communication protocol supporting landnet 112 may be, for example, Transmission Control Protocol (TCP/IP), HTTP, or Secure HTTP (sHTTP).

Figure 2:
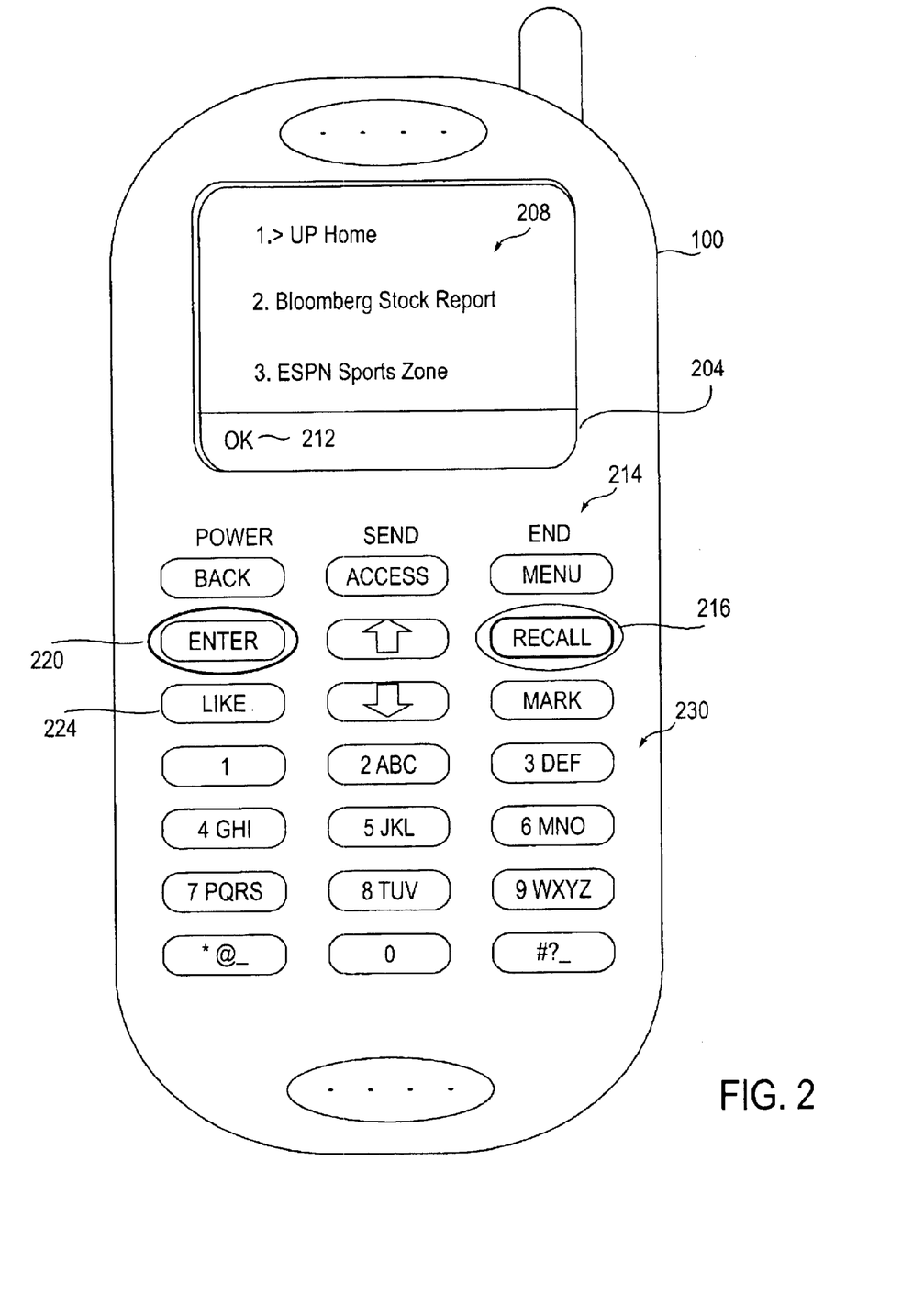
FIG. 2 is a schematic view of a two-way mobile communications device.

FIG. 2 is a schematic view of the mobile device 100, according to one embodiment. As shown, mobile device 100 includes a display screen 204 and a keypad 214. Display screen 204 may display hypermedia information 208 and one or more softkey identifiers, such as softkey identifier 212. Keypad 214 includes numerical keys 230 (such as for dialing a telephone number), function keys (e.g. "LIKE", "BACK"), alphanumeric keys, and navigation keys (up and down arrows). Additionally, function keys 216 and 220 are utilized for soft key inputs corresponding to softkey identifiers. Of course, many variations on the user interface 214 are possible.

The hypermedia information 208 shown in FIG. 2 includes a list of selectable identifiers (e.g. "UP Home") having corresponding Uniform Resource Identifiers (URIs). Hypermedia information 208 may be, for example, a WML file, or "deck", including one or more WML cards. Activating function key 220 with the selection symbol ">" aligned with the item "1. UP Home" causes mobile device 100 to retrieve the WML card associated with the URL of that item.

In addition, the user may enter a URL manually to access hypermedia content, using the numerical keys 230. To facilitate this operation, the microbrowser provides several different input modes, specifically, a number input mode, an alphabetic input mode, a symbol input mode, and a URL input mode. As described further below, the URL input mode in particular allows the user to enter a URL more easily.

Figure 3:
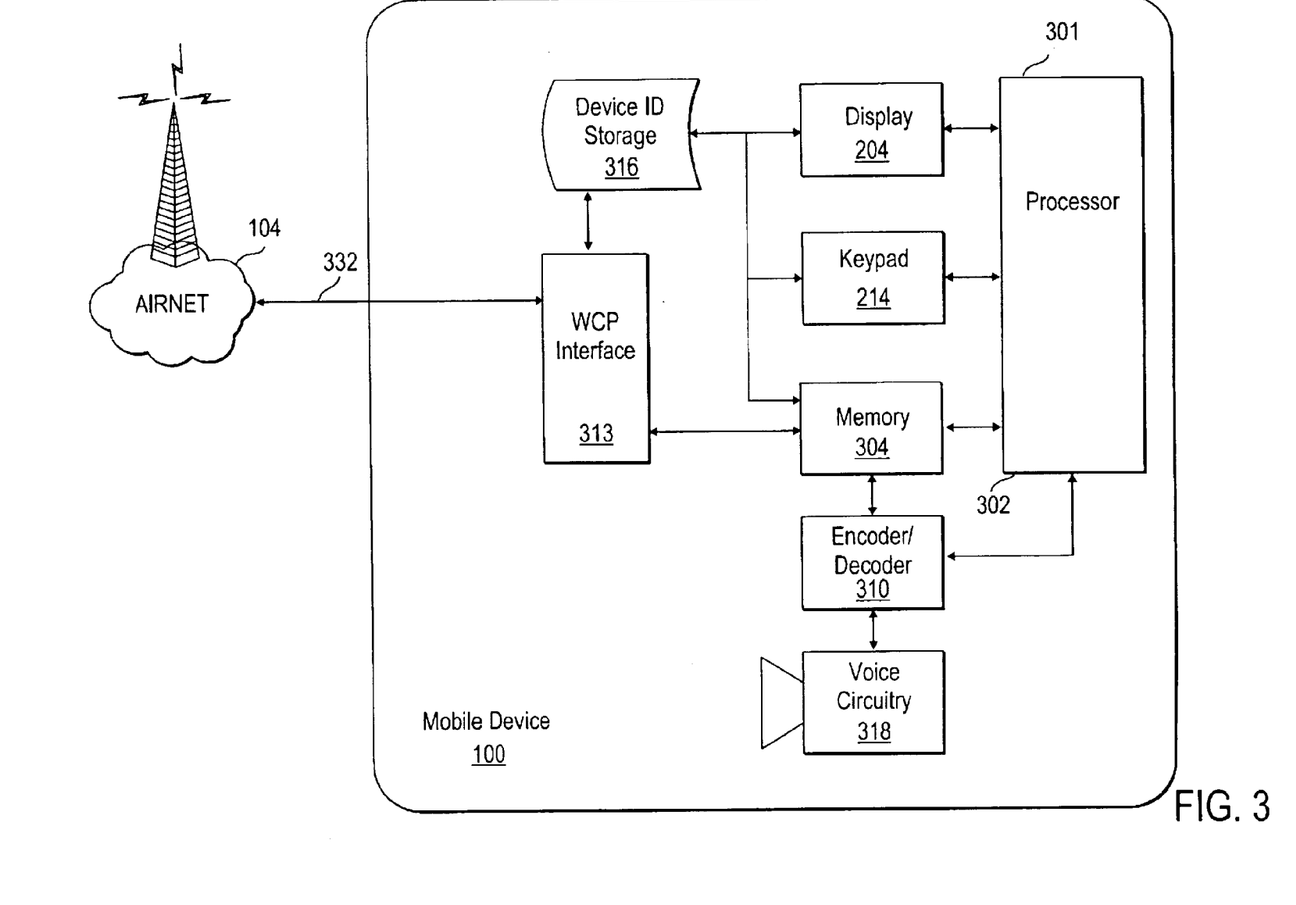
FIG. 3 is a block diagram of the principle components of a two-way mobile communications device.

FIG. 3 is a block diagram showing the principle components of mobile device 100, according to one embodiment. The mobile device 100 includes a processor 301, which may be or include any of: a general- or special-purpose programmable microprocessor, Digital Signal Processor (DSP), Application Specific Integrated Circuit (ASIC), Field Programmable Gate Array (FPGA), etc., or a combination thereof. Mobile device 300 includes a Wireless Control Protocol (WCP) interface 328 that couples to a carrier network via airnet 104 to receive incoming and outgoing signals. Device identifier (ID) storage 316 stores and supplies to WCP interface 332 a device ID, for the purpose of identifying mobile device 300 to outside entities (e.g. proxy server device 108). The device ID identifies a specific code that is associated with mobile device 100 and directly corresponds to the device ID in the user account typically provided in an associated proxy server device, such as proxy server 108.

In addition, mobile device 100 includes memory 304 that stores data and/or software for performing many of the processing tasks performed by mobile device 100, including the microbrowser, when executed by processor 301. These tasks include: establishing a communication session with a proxy server device via wireless link 332 and airnet 104; receiving user inputs from keypad 214; requesting and receiving data from the carrier network; and displaying information on the display screen 204. Hence, memory 304 may include any type of Random Access Memory (RAM), Read-Only Memory (ROM) (which may be programmable), flash memory, non-volatile mass storage device, or any combination thereof. Memory 304 is also coupled to WCP interface 328 for the establishment of a communication session and the requesting and receiving of data.

The mobile device 100 also includes voice circuitry 318 for inputting and outputting audio during a telephonic communication between the user of mobile device 100 and a remote party. Voice circuitry 318 may include, for example, sound transducers, analog-to-digital (A/D) and digital-to-analog (D/A) converters, filters, etc., such as are well-known in the art. An encoder/decoder 310 is coupled between the processor 301 and the voice circuitry 318 for encoding and decoding audio signals.

As noted above, the microbrowser provides several user input modes, using which a user can input a URL. These modes include a number input mode, an alphabetic input mode, a symbol input mode, and a URL input mode. The user selects the input mode using key 216 of keypad 214 (see FIG. 2). Specifically, pressing key 216 cycles through these four input modes, which are indicated by a softkey identifier in the display. When the mobile device 100 is in the number input mode, the user can enter numbers using number keys 230. In the alphabetic input mode, the number keys 230 operate to enter alphabetic characters. In the symbol mode, the user can enter special characters, such as "*", "#", or "^" using the number keys and/or other keys.

Figure 4:
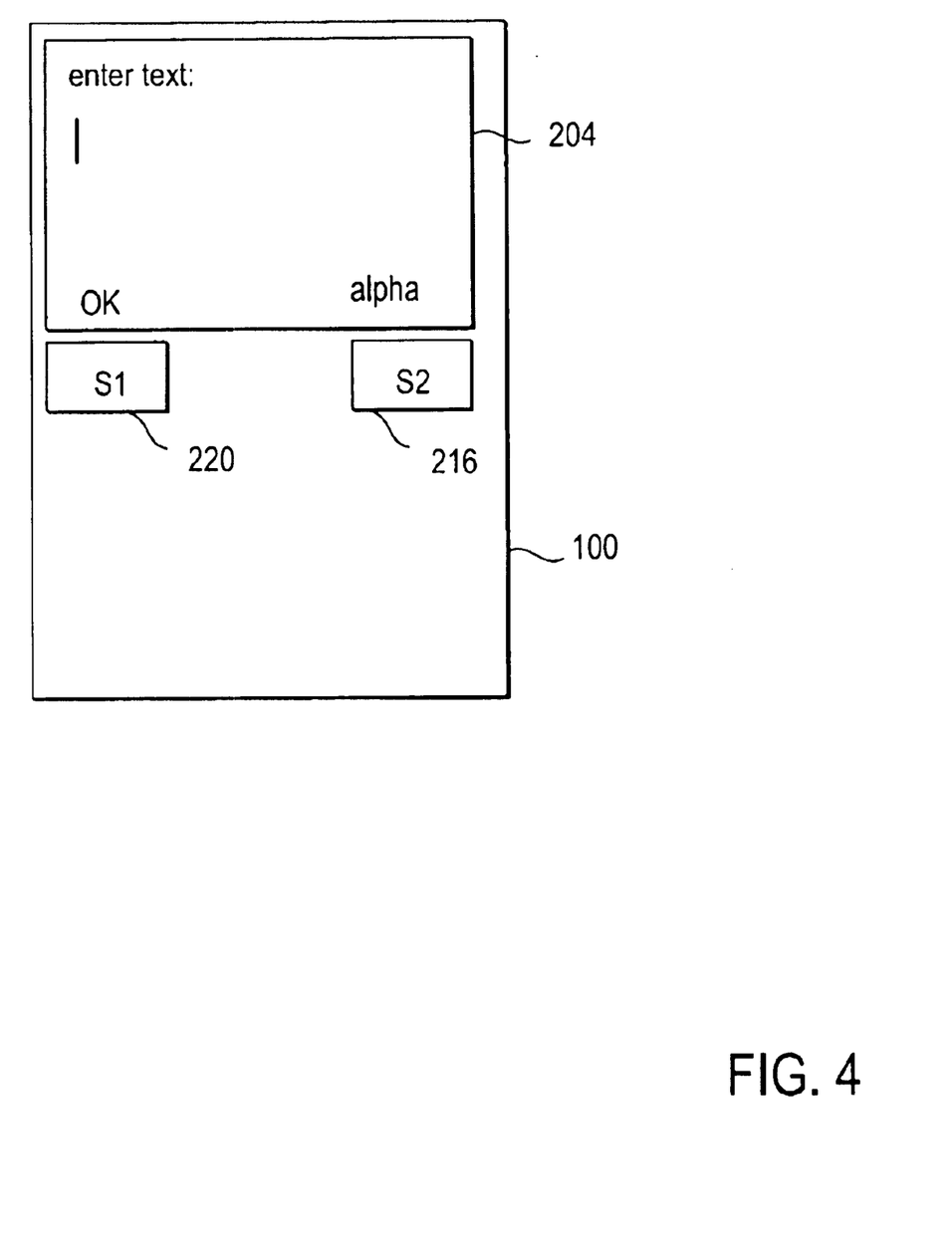
FIG. 4 shows a mobile device in an alphabetic entry mode.
Figure 5:
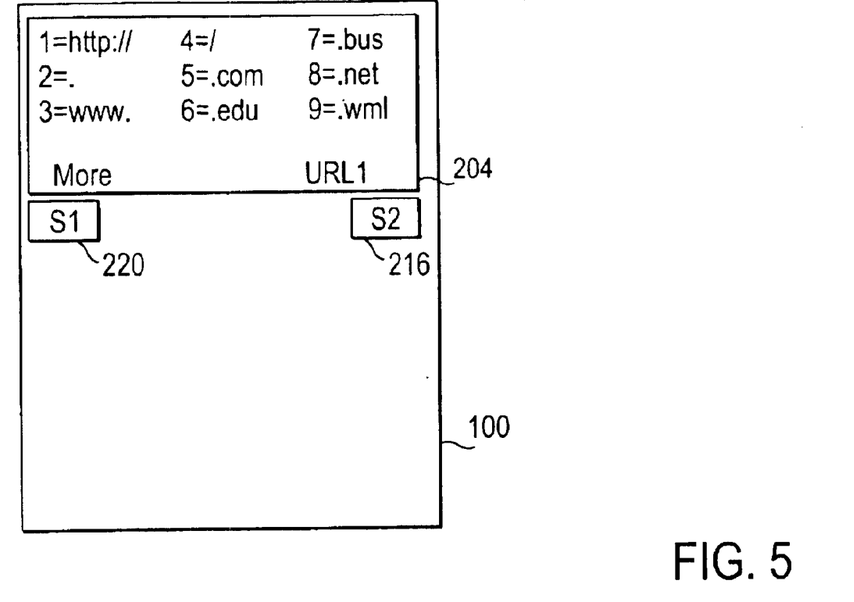
FIGS. 5 and 6 show a mobile device in a URL entry mode.

The URL input mode allows the user to enter a URL more easily. Refer now to FIG. 4, which is a simplified illustration of the mobile device 100 while in the alphabetic entry mode, as indicated by the softkey identifier "alpha" in the lower right corner of the display 204. The prompt "enter text:" is displayed on the display device 204 to inform the user that the mobile device is ready to input a URL. By pressing key 216 to cycle to the URL input mode, the display may appear as shown in FIG. 5. Stored in memory 304 of the mobile device 100 are a number of commonly-used URL fragments, each consisting of a character or character string commonly used in URLs, such as the following control characters and control character strings: "http://", ".", "www.", "/", ".com", ".edu", ".bus", ".net", ".gov", ".wml", "https://", ".wmls", ".hdml", ".cgi", ".asp", "~", "?", etc. Each of these URL fragments is associated with one of the number keys 230 as indicated by the display in FIG. 5. For example, the number "1" key represents "http://" in the URL input mode, the number "5" key represents ".com" in the URL input mode, etc. The association between each number key and its corresponding URL fragment is indicated by information stored within the mobile device in any suitable format, such as a look-up table or index. The user can therefore press the appropriate number key to select the corresponding URL fragment, which is then displayed on the display 204.

Figure 6:
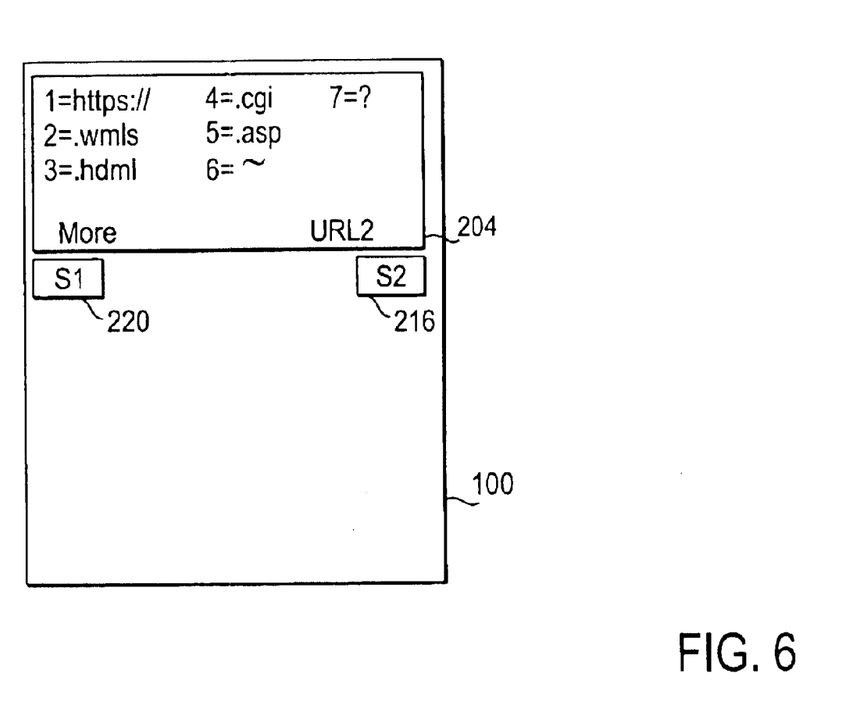
Figure 7:
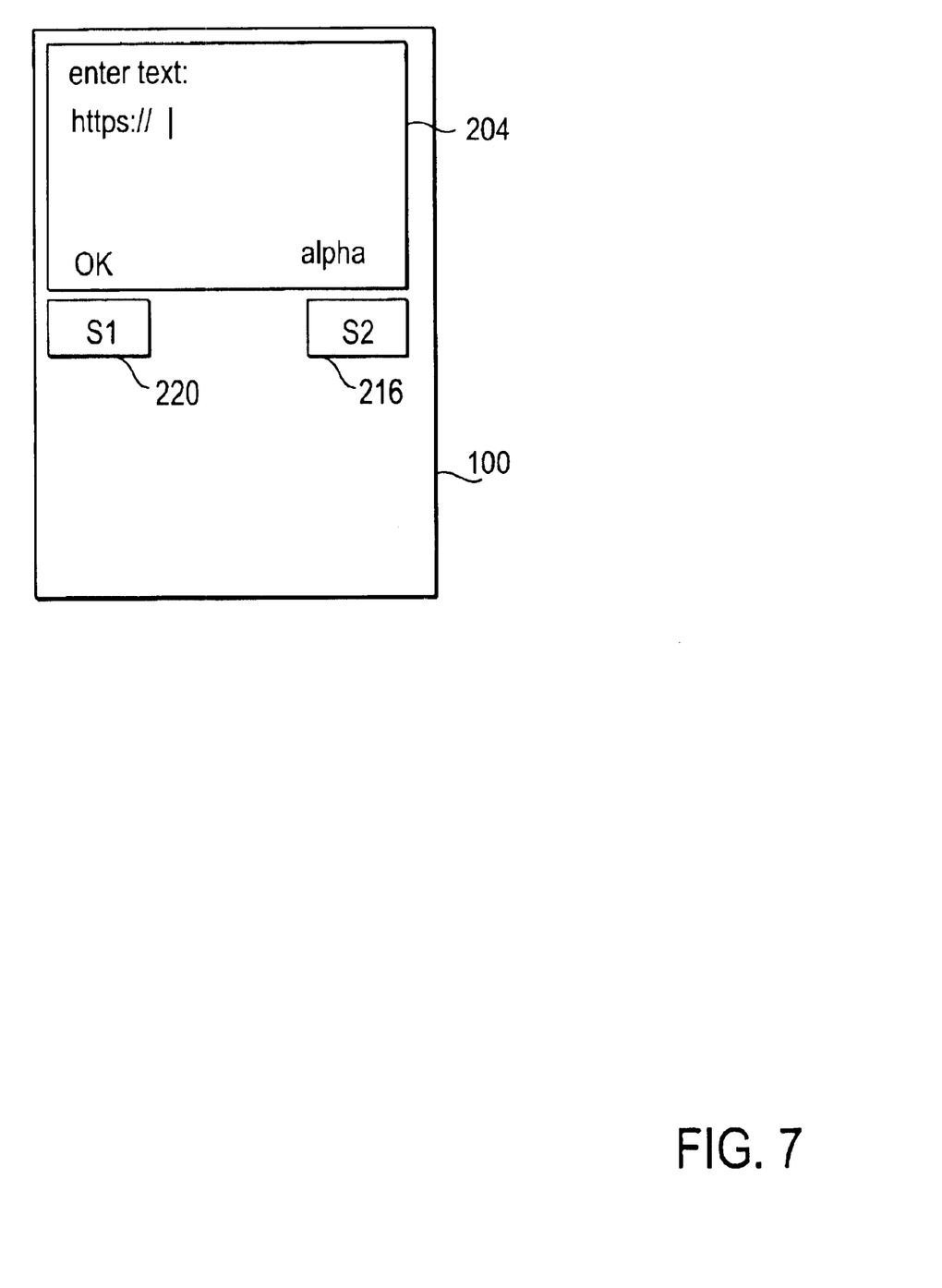
FIG. 7 shows a mobile device in the alphabetic entry mode following entry of a URL fragment.

In FIG. 5, the softkey identifier "URL1" in the lower right corner of the display indicates that the display is in the URL input mode and is showing the first of multiple URL input cards. Note that it is not necessary to provide more than one URL input card; however, it may be desirable to do so to provide a large number of selectable URL fragments. By pressing key 216 again, the user can cycle out of the URL input mode to the next input mode. If instead the user presses key 220, the second URL input card is displayed, as shown in FIG. 6, giving a second set of URL fragments. Thus, if the user presses the number "1" key while the second URL input card is displayed (FIG. 6), the display would in response appear as in FIG. 7. Note that the display automatically returns to the alphabetic input mode in response to selection of a URL fragment, to allow the user to easily enter other characters of a URL.

After selecting a URL fragment, the user can then use any of the four input modes to enter additional characters, which are automatically appended to the characters displayed thus far. Similarly, if the user had already entered characters in one of the input modes, the selected URL fragment would be automatically appended to those characters. As an example, assume the user wishes to enter the URL "http://www.phone.com". The user may do so, starting from the alphabetic input mode, by: 1) using key 216 to cycle to the "URL1" display of the URL input mode; 2) pressing the number "1" key to cause "http://" to be displayed (the display then automatically returns to the alphabetic input mode); 2) using key 216 to again enter the "URL1" display of the URL input mode; 3) pressing the number "3" key to cause "www." to be displayed, which is appended to the displayed "http://" to form "http://www." (the display then automatically returns to the alphabetic input mode); 4) typing "phone" using the number keys 230 in the alphabetic input mode, which is appended to the displayed "http://www." to form "http://www.phone"; 4) using key 216 to again enter the "URL1" display of the URL input mode; 5) pressing the number "5" key to cause ".com" to be displayed (the display then automatically returns to the alphabetic input mode), which is appended to the displayed "http://www.phone" to form the complete URL, "http://www.phone.com"). The user can then enter the URL to access the corresponding hypermedia page. Thus, starting in the alphabetic input mode, the user has input this URL using a total of only 11 keystrokes, instead of 20 (the total number of characters in the URL). By including the URL input mode in the mobile device 100, therefore, the number of inputs required for a user to input a URL is reduced, reducing the opportunity for the user to become annoyed, frustrated, discouraged or fatigued. In this way, the mobile device 100 is made more "user-friendly".

Thus, a method and apparatus for have been described for reducing the number of inputs required for a user to access hypermedia content from a mobile communication device. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operation of a mobile telephone having a display device and a set of input keys, the method comprising:

operating in a voice mode to enable a user of the mobile telephone to have a two-way voice communication with a remote party via a wireless communication link; and operating in a browser mode to enable the user to access remotely-stored hypermedia content via the wireless communication link, including providing a number input mode in which the user is enabled to input numerical characters using the set of input keys, providing an alphabetic input mode in which the user is enabled to input alphabetic characters using the set of input keys, storing a plurality of hypermedia identifier fragments, maintaining information specifying a correspondence between each of the hypermedia identifier fragments and one of the input keys, and providing a hypermedia identifier input mode, separate from the number input mode and the alphabetic input mode, in which the user is enabled to input hypermedia identifiers using the set of input keys, including responding to a single user input directed to one of the input keys by causing a corresponding one of the stored hypermedia identifier fragments to be selected and displayed on the display device;

wherein said one of the stored hypermedia identifier fragments can be appended to a previously input character string or can have a subsequently input character string appended thereto, to form at least a portion of the hypermedia identifier.

2. A method as recited in claim 1, further comprising providing a symbol input mode, separate from the number input mode, the alphabetic input mode, and the hypermedia identifier input mode, in which the user is enabled to input symbols other than numerical or alphabetic characters by using the set of input keys.

3. A method as recited in claim 1, wherein the plurality of hypermedia identifier fragments comprise a plurality of URI fragments.

4. A mobile communication device comprising:

a processor;

a display;

a set of input keys, each operable to allow a user to input a predetermined numeral, the input keys being operable by the user to input a telephone number to be called;

voice circuitry to enable telephonic communication between a user and a remote party via a wireless link; and a storage facility having stored therein:

a microbrowser program executable by the processor to configure the mobile communication device to allow a user to access remotely stored hypermedia content via a wireless link, the microbrowser program having a plurality of input modes, including a number input mode in which the user is enabled to input numerical characters using the set of input keys, an alphabetic input mode in which the user is enabled to input alphabetic characters using the set of input keys, and a hypermedia identifier input mode, separate from the number input mode and the alphabetic input mode, in which the user is enabled to input a hypermedia identifier using the set of input keys, and a plurality of hypermedia identifier fragments, wherein the microbrowser program includes instructions executable by the processor, when the microbrowser is in the hypermedia identifier input mode, to cause a corresponding one of the stored hypermedia identifier fragments to be displayed on the display in response to a single user input at one of the user input keys.

5. A method as recited in claim 4, wherein the microbrowser program further provides a symbol input mode, separate from the number input mode, the alphabetic input mode, and the hypermedia identifier input mode, in which the user is enabled to input symbols other than numerical or alphabetic characters by using the set of input keys.

6. A method as recited in claim 4, wherein the plurality of hypermedia identifier fragments comprise a plurality of URI fragments.

* * * * *